US011477007B1

(12) United States Patent
Soceanu et al.

(10) Patent No.: US 11,477,007 B1
(45) Date of Patent: Oct. 18, 2022

(54) PACKING ARBITRARY TENSORS INTO TILES WITH DESCRIPTIVE SHAPES

(71) Applicant: International Business Machines Corporation, Armonk, NY (US)

(72) Inventors: Omri Soceanu, Haifa (IL); Ehud Aharoni, Kfar Saba (IL); Allon Adir, Kiryat Tivon (IL); Lev Greenberg, Haifa (IL); Gilad Ezov, Nesher (IL); Ramy Masalha, Kafr Qari (IL)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/229,046

(22) Filed: Apr. 13, 2021

(51) Int. Cl.
*H04L 9/00* (2022.01)
(52) U.S. Cl.
CPC .................................. *H04L 9/008* (2013.01)
(58) Field of Classification Search
CPC ........................................................ H04L 9/08
See application file for complete search history.

(56) References Cited

U.S. PATENT DOCUMENTS

| | | | |
|---|---|---|---|
| 6,898,691 B2 | 5/2005 | Blomgren et al. | |
| 7,873,812 B1 | 1/2011 | Mimar | |
| 11,263,170 B1* | 3/2022 | Nama | G06F 15/7839 |
| 2019/0050717 A1* | 2/2019 | Temam | G06N 3/063 |
| 2019/0303155 A1* | 10/2019 | Eapen | G06F 9/34 |
| 2020/0076570 A1* | 3/2020 | Musuvathi | G06F 21/72 |
| 2020/0104126 A1 | 4/2020 | Pearce | |

FOREIGN PATENT DOCUMENTS

KR 20200070121 A 6/2020

OTHER PUBLICATIONS

Privacy-Preserving Tensor Decomposition Over Encrypted Data in a Federated Cloud Environment, Feng al et., published 2020 (Year: 2020).*
CHET: An Optimizing Compiler for Fully-Homomorphic Neural-Network Inferencing, by Chen al et, published 2019 (Year: 2019).*
"Microsoft SEAL is an easy-to-use and powerful homomorphic encryption library", GitHub, microsoft/SEAL, downloaded from the Internet on Mar. 11, 2021, 19 pages, <https://github.com/Microsoft/SEAL>.

(Continued)

*Primary Examiner* — Vu V Tran
(74) *Attorney, Agent, or Firm* — David B. Woycechowsky

(57) ABSTRACT

An efficient packing method that will optimize use of the homomorphic encryption ciphertext slots, trading-off size, latency, and throughput. Technology for working with tensors (multi-dimensional arrays) in a system that imposes tiles, that is, fixed-size vectors. An example of a system that imposes tiles are homomorphic encryption schemes, where each ciphertext encrypts a vector of some fixed size. The tensors are packed into tiles and then manipulated via operations on those tiles. Also, syntax for notation for describing packing details. This technology interprets the tiles as multi-dimensional arrays, and combines them to cover enough space to hold the tensor. An efficient summation algorithm can then sum over any dimension of this tile tensor construct that exists in the physical or logical addressing space of a computer data memory.

25 Claims, 12 Drawing Sheets

(56) References Cited

OTHER PUBLICATIONS

Agrawal et al., "Privacy-Preserving Data Mining", ACM SIGMOD 2000, 5/00 Dallas, TX, USA, 12 pages.
Boemer et al., "nGraph-HE: a Graph Compiler for Deep Learning on Homomorphically Encrypted Data", in Proceedings of the 16th conference on Computing Frontiers (CF '19), Apr. 30-May 2, 2019, Alghero, Italy. ACM, New York, NY, USA, 13 pages, https://doi.org/10.1145/3310273.3323047.
Brakerski et al., "(Leveled) Fully Homomorphic Encryption without Bootstrapping", ITCS '12 Cambridge, MA USA, pp. 309-325.
Brakerski, et al., "Lattice-based FHE as Secure as PKE", ITCS'14, Jan. 12-14, 2014, Princeton, New Jersey, USA, http://dx.doi.org/10.1145/2554797.2554799, 12 pages.
Brutzkus et al., "Low Latency Privacy Preserving Inference", Proceedings of the 36th International Conference on Machine Learning, Long Beach, California, PMLR 97, 2019, 10 pages.
Chen et al., "Improved Bootstrapping for Approximate Homomorphic Encryption", Oct. 28, 2018, 21 pages.
Cheon et al., "Homomorphic Encryption for Arithmetic of Approximate Numbers", ASIACRYPT 2017, Part I, LNCS 10624, pp. 409-437, 2017, https://doi.org/10.1007/978-3-319-70694-8_15.
Chillotti et al., "TFHE: Fast Fully Homomorphic Encryption Over the Torus*", J Cryptol (2020) 33:34-91, https://doi.org/10.1007/s00145-019-09319-x, © International Association for Cryptologic Research 2019, 58 Pages.
Cormen et al., "Introduction to Algorithms", 3rd Edition, The MIT Press, Cambridge, MA, 2009, Chapter 31.6, pp. 954-958.
Crockett, Eric, "A Low-Depth Homomorphic Circuit for Logistic Regression Model Training", Jan. 8, 2021, WAHC 2020, 33 pages.
Dathathri et al., "EVA: an Encrypted Vector Arithmetic Language and Compiler for Efficient Homomorphic Computation", PLDI '20, Jun. 15-20, 2020, London, UK, https://doi.org/10.1145/3385412.3386023, pp. 546-561.
Dowlin et al., "CryptoNets: Applying Neural Networks to Encrypted Data with High Throughput and Accuracy", Proceedings of the 33rd International Conference on Machine Learning, New York, NY, USA, 2016, 10 pages.
Du et al., "Privacy-preserving cooperative scientific computations," Proceedings. 14th IEEE Computer Security Foundations Workshop, 2001., Cape Breton, NS, Canada, 2001, pp. 273-282, doi: 10.1109/CSFW.2001.930152.
Gentry et al., "Homomorphic Encryption from Learning with Errors: Conceptually-Simpler, Asymptotically-Faster, Attribute-Based", CRYPTO 2013, Part I, LNCS 8042, pp. 75-92, 2013.
Gentry, Craig, "A Fully Homomorphic Encryption Scheme", Dissertation Submitted to the Committee of Graduate Studies of Stanford University in Partial Fulfillment of the Requirements for the Degree of Doctor of Philosophy, Sep. 2009, 209 pages.
Han et al., "Efficient Logistic Regression on Large Encrypted Data", 31 pages, Received Jul. 9, 2018, last revised Jul. 10, 2018.
Kim et al., "Logistic Regression Model Training based on the Approximate Homomorphic Encryption", 13 pages, received Mar. 7, 2018, last revised Mar. 7, 2018.
Kim et al., "Secure Logistic Regression Based on Homomorphic Encryption: Design and Evaluation", 14 pages, received Jan. 16, 2018, last revised Mar. 26, 2018.
Kim, Yoon, "Convolutional Neural Networks for Sentence Classification", 6 pages, arXiv:1408.5882v2 [cs.CL] Sep. 3, 2014.
Knuth, Donald E., "The Art of Computer Programming", Third Edition, 1997, Chapter 4.6.3, pp. 461-485.
Lang, Ken, "CMU Text Learning Group Data Archives", 20_newsgroup, downloaded from the internet on Mar. 11, 2021, 1 page, <http://www.cs.cmu.edu/afs/cs.cmu.edu/project/theo-20/www/data/news20.html>.
Lecun et al., "The MNIST Database of handwritten digits", downloaded from the Internet on Mar. 17, 2021, <http://yann.lecun.com/exdb/mnist/>, 8 pages.
Nandakumar et al., "Towards Deep Neural Network Training on Encrypted Data", 2019 IEEE/CVF Conference on Computer Vision and Pattern Recognition Workshops, DOI 10.1109/CVPRW.2019.00011, 9 pages.
Slavkovic et al., ""Secure" Logistic Regression of Horizontally and Vertically Partitioned Distributed Databases", Seventh IEEE International Conference on Data Mining—Workshops, DOI 10.1109/ICDMW.2007.114, 0-7695-3019-2/07 © 2007 IEEE, 6 pages.
Tensorflow, "An end-to-end open source machine learning platform", 14 pages, <https://www.tensorflow.org>, downloaded from the internet in Mar. 11, 2021.
Vaidya et al., "Privacy-preserving SVM classification", Knowl Inf Syst (2008) 14: 161-178, DOI 10.1007/s10115-007-0073-7, Received: Apr. 12, 2006 / Revised: Nov. 14, 2006 / Accepted: Jan. 26, 2007, Published online: Mar. 24, 2007, Copyright Springer-Verlag London Limited 2007, 18 pages.
Aharoni et al., "Tile Tensors: a versatile data structure with descriptive shapes for homomorphic encryption", arXiv:2011.01805v1 [cs.CR] Nov. 3, 2020, 17 pages, Grace Period Disclosure Document.
Bergstrom et al., "Data-Only Flattening for Nested Data Parallelism", PPoPP '13: Proceedings of the 18th ACM SIGPLAN symposium on Principles and practice of parallel programming Feb. 23-27, 2013, Shenzhen, China, pp. 81-92, <https://doi.org/10.1145/2442516.2442525>.
Cheon et al., "Bootstrapping for Approximate Homomorphic Encryption", Copyright International Association for Cryptologic Research 2018, J. B. Nielsen and V. Rijmen (Eds.): EUROCRYPT 2018, LNCS 10820, pp. 360-384, 2018, <https://doi.org/10.1007/978-3-319-78381-9_14>.
Dathathri et al., "CHET: an Optimizing Compiler for Fully-Homomorphic Neural-Network Inferencing", PLDI '19, Jun. 22-26, 2019, Phoenix, AZ, USA, © 2019 Association for Computing Machinery, 15 pages, <https://doi.org/10.1145/3314221.3314628>.
Fujimoto, Noriyuki, "Faster Matrix-Vector Multiplication on GeForce 8800GTX", in the proceedings of IEEE International Parallel & Distributed Processing Symposium (IPDPS) 2008, presented at IPDPS Workshop on Large Scale Parallel Processing (LSPP), 8 pages.
Halevi et al., "Algorithms in HElib", CRYPTO 2014, Part I, LNCS 8616, pp. 554 571, 2014, Copyright International Association for Cryptologic Research 2014.
Jiang et al., "Secure Outsourced Matrix Computation and Application to Neural Networks", Session 6C: Crypto 3, CCS'18, Oct. 15-19, 2018, Toronto, ON, Canada, <https://doi.org/10.1145/3243734.3243837>, pp. 1209-1222.
Juvekar et al., "GAZELLE: a Low Latency Framework for Secure Neural Network Inference" This paper is included in the Proceedings of the 27th USENIX Security Symposium, Aug. 15-17, 2018, Baltimore, MD, USA, 19 pages.
Kapadia et al., "Block-Row Sparse Matrix-Vector Multiplication on SIMD Machines", downloaded from the internet on Jul. 30, 2020, 8 pages.
Lindell et al., "Privacy Preserving Data Mining", CRYPTO 2000, LNCS 1880, pp. 36-54, 2000, Copyright Springer-Verlag Berlin Heidelberg 2000.

* cited by examiner

| 0 |
|---|
| 10 |
| 20 |
| 30 |
| 40 |

| 0 | 0 | 0 |
|---|---|---|
| 10 | 10 | 10 |
| 20 | 20 | 20 |
| 30 | 30 | 30 |
| 40 | 40 | 40 |

|  0 |  0 |  0 | 0 | 10 | 10 | 10 | 0 |
| 20 | 20 | 20 | 0 | 30 | 30 | 30 | 0 |
| 40 | 40 | 40 | 0 |  0 |  0 |  0 | 0 | k=2, n1=5, n2=1
r1=1, r2=3
t1=2 t2=4

FIG. 6A

| 60 | 60 | 60 | 0 | 40 | 40 | 40 | 0 |

FIG. 6B

| 100 | 100 | 100 | 0 | 100 | 100 | 100 | 0 | k=2, n1=1, n2=1
r1=2, r2=3
t1=2 t2=4

FIG. 6C

| 0 | 10 | 20 | 0 | 30 | 40 | 50 | 0 |
|---|---|---|---|---|---|---|---|
| 60 | 70 | 80 | 0 | 0 | 0 | 0 | 0 | k=2, n1=3, n2=3
r1=1, r2=1
t1=2 t2=4

FIG. 7A

| 30 | 60 | 90 | 120 | 120 | 90 | 60 | 30 |
|---|---|---|---|---|---|---|---|
| 210 | 150 | 0 | 0 | 0 | 60 | 130 | 210 | k=2, n1=3, n2=1
r1=1, r2=1
t1=2 t2=4
u1=false, u2=true

FIG. 7B

TILE TENSOR A

| 0 | 1 | 2 | 3 | 10 | 11 | 12 | 13 | 4 | 5 | 0 | 0 | 14 | 15 | 0 |
|---|---|---|---|----|----|----|----|---|---|---|---|----|----|---|
| 20 | 21 | 22 | 23 | 30 | 31 | 32 | 33 | 24 | 25 | 0 | 0 | 34 | 35 | 0 |
| 40 | 41 | 42 | 43 | 0 | 0 | 0 | 0 | 44 | 45 | 0 | 0 | 0 | 0 | 0 |

TILE TENSOR B

| 100 | 101 | 102 | 103 | 100 | 101 | 102 | 103 | 104 | 105 | 0 | 0 | 104 | 105 | 0 |
|-----|-----|-----|-----|-----|-----|-----|-----|-----|-----|---|---|-----|-----|---|

TILE TENSOR B

| 100 | 101 | 102 | 103 | 100 | 101 | 102 | 103 | 0 | 0 | 0 | 104 | 105 | 0 | 0 | 0 | 104 | 105 | 0 |
|---|---|---|---|---|---|---|---|---|---|---|---|---|---|---|---|---|---|---|
| 100 | 101 | 102 | 103 | 100 | 101 | 102 | 103 | 0 | 0 | 0 | 104 | 105 | 0 | 0 | 0 | 104 | 105 | 0 |
| 100 | 101 | 102 | 103 | 100 | 101 | 102 | 103 | 0 | 0 | 0 | 104 | 105 | 0 | 0 | 0 | 104 | 105 | 0 |

FIG. 9C

TILE TENSOR C

| 100 | 102 | 104 | 106 | 110 | 112 | 114 | 116 | 108 | 110 | 0 | 118 | 120 | 0 | 0 | 0 | 0 | 0 | 0 |
|---|---|---|---|---|---|---|---|---|---|---|---|---|---|---|---|---|---|---|
| 120 | 122 | 124 | 126 | 130 | 132 | 134 | 136 | 128 | 130 | 0 | 138 | 140 | 0 | 0 | 0 | 0 | 0 | 0 |
| 140 | 142 | 144 | 146 | 100 | 101 | 102 | 103 | 148 | 150 | 0 | 104 | 105 | 0 | 0 | 0 | 0 | 0 | 0 |

$n1=5, n2=6$
$t1=2, t2=4$
$r1=r2=1$
$u1=\text{false}$
$u2=\text{false}$

FIG. 9D

| TILE TENSOR | | | | | | | | | | | | | | | |
|---|---|---|---|---|---|---|---|---|---|---|---|---|---|---|---|
| 0 | 1 | 2 | 3 | 10 | 11 | 12 | 13 | 4 | 5 | ? | ? | 14 | 15 | ? | ? |
| 20 | 21 | 22 | 23 | 30 | 31 | 32 | 33 | 24 | 25 | ? | ? | 34 | 35 | ? | ? |
| 40 | 41 | 42 | 43 | 0 | 0 | 0 | 0 | 44 | 45 | ? | ? | 0 | 0 | ? | ? | n1=5, n2=6
t1=2, t2=4
r1=r2=1
u1=false
u2=true

PACKING ARBITRARY TENSORS INTO TILES WITH DESCRIPTIVE SHAPES

STATEMENT REGARDING PRIOR DISCLOSURES BY THE INVENTOR

The following disclosure(s) are submitted under 35 U.S.C. 102(b)(1)(A): "Tile Tensors: A versatile data structure with descriptive shapes for homomorphic encryption", by Ehud Aharoni, Allon Adir, Moran Baruch, Gilad Ezov, Ariel Farkash, Lev Greenberg, Ramy Masalha, Dov Murik and Omri Soceanu, Published by arVix (arXiv is a free distribution service and an open-access archive) on 3 Nov. 2020.

BACKGROUND

The present invention relates generally to the following fields: tensors, tiles, homomorphic encryption and artificial intelligence. It is noted that the field of tensors is a mathematically oriented field. Preliminary note on the use of the term "we" is as follows: "we" is used herein in the same way that this pronoun is typically used in technology writing (for example, articles in technical journals), and should be understood here in a manner similar to how the pronoun would be used in that context; sometimes the "we" may refer to the co-inventors of the present application, and sometimes the word "we" will refer to other people and/or things, as will be apparent, on a "we" instance to "we" instance basis, from context to those of ordinary skill in the art of reading.

As the term is used herein, a "tensor" is any multi-dimensional array of numbers. One special case for tensors, conceptually speaking, is when the array is one dimensional, in which case the array is generally referred to as a vector, and, in the case of a two dimensional vector it is commonly referred to as a matrix. It is understood in the art that the numbers making up a tensor can be integers or floating-point numbers or complex numbers. However, in some tensors, the elements of a vector may not take the form of numbers, but, rather, these elements may take other forms, such as characters, strings, or other objects. In the specific examples discussed in this document, it will generally be assumed that the tensors contain elements in the form of numbers unless otherwise noted.

It is known that tensors can be packed into tiles and further that mathematical operators can be performed on these tensors while in packed form.

As used herein, a "tile" is any contiguous block of data storage in a data storage device (for example, a volatile memory type data storage device) of fixed size, capable of holding n numbers, where n is some fixed size determined by system configuration. In this way, all tiles will have the same size of n numbers. It is understood by those of skill in the art that mathematical operations can be performed on the elements of tiles (for example, the numbers making up a tile). Such a mathematical operation is typically performed element-wise on the respective numbers of the respective tile(s) being subject to the mathematical operation. For example, if tile T1 has the numbers (x1, x2, . . . xn) and tile T2 has the numbers (y1, y2, . . . yn), then T1+T2 is a tile containing (x1+y1, x2+y2, . . . xn+yn). And similarly, T1*T2 is a tile containing (x1*y1, x2*y2, . . . , xn*yn). Readers further assume tiles can be rotated by an any offset r, which means moving each element r slots to the left (or to the right if r is negative), and first elements rotate back to being last. For example, if T1=(1,2,3,4,5,6,7,8) then T1 rotated by 2 is (3,4,5,6,7,8,1,2) and rotate by −2 is (7,8,1,2,3,4,5,6).

Those of skill in the art will appreciate that a tile may represent any sort of data structure which can hold n numbers, and to which mathematical operations can be applied. It should be kept in mind that a tile does not have to be a physically, or logically, contiguous block of memory, but any data structure that can hold n numbers. For example, a homomorphic encryption ciphertext (HAC) can be used as a tile. Those of skill in the art will further appreciate that an HAC can hold (encrypted) n numbers, where n is a value determined by a homomorphic encryption library configuration. Those of skill in the art will further appreciate that it is possible to add or multiply two ciphertexts, and to rotate a ciphertext. Those of skill in the art will further appreciate that in some situations such tiles are imposed—that is, some computation must be done using the values stored in the tiles. For example, say the computation is inference over a neural network. The neural network is made of tensors and the input to the inference process is yet another tensor. The computation involves operations such as matrix multiplication, and other operations on tensors. If there is operative a requirement to do this computation when all the data is encrypted with homomorphic encryption, then all the data of all the tensors involves must be copied into tiles, where the tiles are ciphertexts (for example HAC (homomorphic encryption ciphertext) style ciphertexts). In this kind of case, the computation must proceed using operators on tiles.

Those of skill in the art will recognize that other situations where tiles are imposed is certain types of hardware, for example, GPU (graphics processing unit), which only operate with data arranged in tiles, and by perform operations on tiles.

It is known how to pack a matrix by dividing it to smaller equally-sized sub-matrices chunks so as to fit a ciphertext size, or a tile. The sub-matrices are flattened, for example, in row-major order, to fill a one dimensional tile. It is further known how to pack a horizontal vector into 2D matrix chunks with using the vertical dimension for replication, with the matrix chunks similarly flattened into tiles. It is further known how to pack a vertical vector into 2D matrix chunks with using the horizontal dimension for replication, similarly flattened to tiles. It is further known that there may be two separate summation algorithms: one for summing over the rows of 2D matrix tile, and one for summing over the columns of a 2D matrix tile, and extend it to 2D array of tiles. It is further known how to compute consecutive matrix-vector multiplications.

SUMMARY

According to an aspect of the present invention, there is a method, computer program product and/or system that performs the following operations (not necessarily in the following order): (i) receiving input tensor metadata including: (a) an integer value k which is equal to a number of dimensions that characterize an input tensor, and (b) a set of length values, $n_1, n_2, n_k$ that respectively characterize each of the k dimensions of the input tensor; (ii) receiving the input tensor; (iii) receiving packing details for an output tile tensor including information indicative of: (a) a first set of k packing values, $t_1, t_2 \ldots t_k$, that represent tile dimension sizes for the output tile tensor data structure, and (b) a second set of k packing values, $r_1, r_2 \ldots r_k$, that respectively represent replication counts for each dimension of the input tensor; (iv) replicating the input tensor in a computer memory device to obtain an intermediate tensor, with each given dimension of the k dimensions of the input tensor being replicated a number of times equal to the replication count value respectively corresponding to the given dimension, so that the intermediate tensor has a shape characterized by $n_1*r_1, n_2*r_2 \ldots n_k*r_k$ such that an element at zero-based indices $(i_1, i_2, \ldots, i_k)$ of the intermediate tensor is equal to that element as given by the following mathematical expressions: $i_1$ modulo operator $n_1$, $i_2$ modulo operator $n_2 \ldots i_k$ modulo operator $n_k$; (v) allocating a plurality of tiles in the computer memory device, with tile each tile including a sufficient number of memory cells to be capable of storing s numbers; (iv) mapping the plurality of tiles to an output tile tensor that is characterized by dimension sizes equal to the first set of k packing values, $t_1$, $t_2 \ldots t_k$, with the mapping of the plurality of tiles including mapping each element of the tensor respectively mapped to a physical location from a plurality of locations in the computer memory device T[0], T[1], . . . T[s–1]; (vii) constructing the output tile tensor as a data structure in the computer memory device; (viii) computing a mapping between elements of the intermediate tensor and elements of the output tile tensor; and (ix) copying the data making up the intermediate tensor to the output tile tensor data structure in the computer memory device.

According to an aspect of the present invention, there is a method, computer program product and/or system that performs the following operations (not necessarily in the following order): (i) receiving an input tensor; (ii) receiving input tensor metadata including: (i) an integer value k which is equal to a number of dimensions that characterize the input tensor, and (ii) a set of integer values, n1, n2, nk that respectively characterize the size of each of the k dimensions of the input tensor; (iii) receiving packing details for an output tile tensor including information indicative of: (i) a first set of k packing values, t1, t2 . . . tk, that represent tile dimension sizes for the output tile tensor data structure, and (ii) a second set of k packing values, r1, r2 . . . rk, that respectively represent replication counts for each dimension of the input tensor; (iv) replicating the input tensor in a computer memory device to obtain an intermediate tensor, with each given dimension of the k dimensions of the input tensor being replicated a number of times equal to the replication count value respectively corresponding to the given dimension, so that the intermediate tensor has a shape characterized by n1*r1,n2*r2 . . . nk*rk such that an element at zero-based indices (i1,i2, . . . , ik) of the intermediate tensor is equal to the element of the input tensor with indices as given by the following mathematical expressions: i1 modulo n1, i2 modulo n2 . . . ik modulo nk; (v) allocating a plurality of tiles in the computer memory device, with tile each tile including a sufficient number of memory cells to be capable of storing s numbers; (vi) for each given tile T of a plurality of tiles, mapping each location of a plurality of locations of the given tile T in the computer memory device T[0], T[1], . . . T[s–1], to indices of a tensor that is characterized by dimension sizes equal to the first set of k packing values, t1, t2 . . . tk; (vii) constructing the output tensor of tiles as a data structure in the computer memory device; (viii) computing a mapping between elements of the intermediate tensor and elements of the output tensor of tiles; and (ix) copying the data making up the intermediate tensor to the output tensor of tiles data structure in the computer memory device.

BRIEF DESCRIPTION OF THE DRAWINGS

FIG. 6A is a data diagram showing an example of computations according to an embodiment of the present invention;

FIG. 6B is a data diagram showing an example of computations according to an embodiment of the present invention;

FIG. 6C is a data diagram showing an example of computations according to an embodiment of the present invention;

FIG. 7A is a data diagram showing an example of computations according to an embodiment of the present invention;

FIG. 7B is a data diagram showing an example of computations according to an embodiment of the present invention;

FIG. 9A is a data diagram showing an example of computations according to an embodiment of the present invention;

FIG. 9B is a data diagram showing an example of computations according to an embodiment of the present invention;

FIG. 9C is a data diagram showing an example of computations according to an embodiment of the present invention;

FIG. 9D is a data diagram showing an example of computations according to an embodiment of the present invention; and FIG. 10 is a data diagram showing an example of computations according to an embodiment of the present invention.

DETAILED DESCRIPTION

Figure 1:
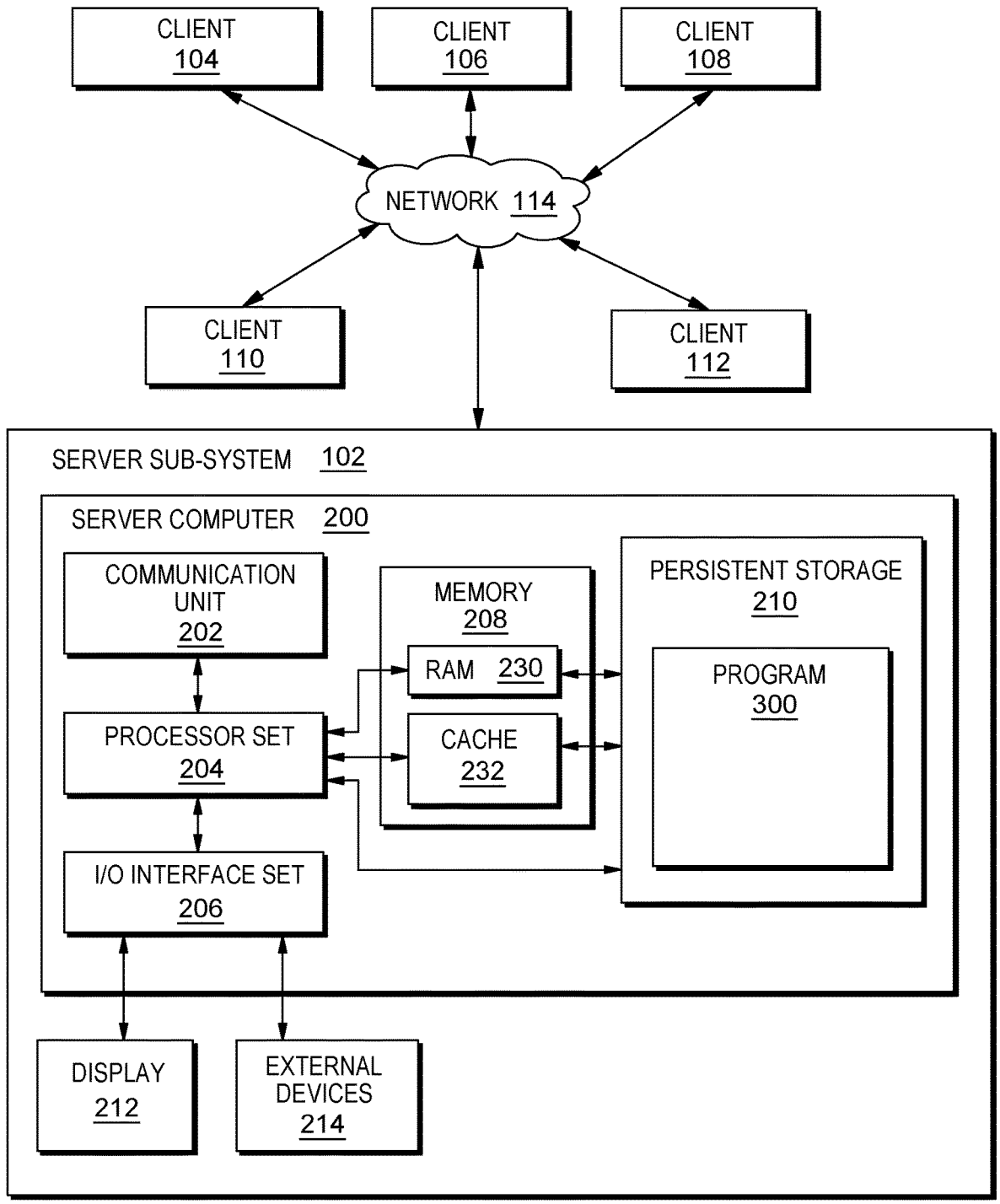
FIG. 1 is a block diagram of a first embodiment of a system according to the present invention.

The process of creating a tile tensor from a tensor is termed packing (see, discussion of flow chart 250 of FIG. 2, below). The inputs to this process are the tensor itself and a tile tensor shape, meta-data indicating the packing scheme. The output is a tile tensor data structure containing a set of tiles filled with data copied from the tensor and arranged within the tiles according to the tile tensor shape. The tile tensor data structure includes copy of the tile tensor shape as well. The tensor can be retrieved back from the tile tensor using a process called "unpacking". The tile tensor shape is used to identify how the tensor's elements are arranged within the tiles, and copied back into a tensor. Given one or more tile tensors, operators can be applied to them. These operators may change both the content of the tiles, and the tile tensor shapes of the tile tensors. This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

As shown in FIG. 1, networked computers system 100 is an environment in which an example method according to some embodiments of the present invention can be performed. As shown in FIG. 2, flowchart and 250 shows an example method according to some embodiments of the present invention. As shown in FIG. 3, program 300 performs or controls performance of at least some of the method operations of flowchart 250. The method of flowchart 250 is a method of packing a tile tensor, which means creation of a tile tensor from a tensor. This method and associated software for packing the tile tensor will now be discussed, over the course of the following paragraphs, with extensive reference to the blocks of FIGS. 1, 2 and 3.

Processing begins at operation S255, where the data of input tensor A1 data set is received with k dimensions of sizes n1, n2 ... nk. More specifically, the user provides the substantive data portion of an input tensor A1 data set. A tensor is a multi-dimension array, with k dimensions and shape [n1, n2, ... nk]. For example, if the input tensor is a matrix with 4 rows and 5 columns, then k=2, n1=4, n2=5. If the input tensor is a vector of length 7, then k=1, n1=7. If the input tensor is a 3d array of dimensions 10 by 20 by 30, then k=3, n1=10, n2=20, n3=30.

Processing proceeds to operation S260 where a packing details portion (also called "metadata") of the tensor A1 data set is received as shown in block S260 of flowchart 250. The input therefore includes two portions as follows: (i) the tensor A1 itself, received at operation S255; and (ii) a tile tensor shape, in the form of metadata indicating the packing details, which is received at operation S260. As will be seen from further descriptions, below, the output is a tile tensor data structure containing a set of tiles filled with data copied from the tensor and arranged within the tiles according to the tile tensor shape. The tile tensor shape consists of the shape of the dimensions of the input tensor A1, namely k, n1, n2, ... nk, and the packing details t1, t2, ..., tk, and r1, r2, ... rk, and has a human readable notation as explained later. The tile tensor data structure includes copy of the tile tensor shape as well. At operation S260, the user provides packing details. A list of integers t1, t2, ..., tk, termed the tile dimension sizes, and another list of integers r1, r2, ..., rk, termed the replication counts. The tile dimension sizes must satisfy t1*t2* ... *tk=s, where s is the size of each tile. Some embodiments can also partially work if t1*t2* ... *tk<s, except some properties of the sum operator will not be available. This is mentioned again later. Note that in the following it is assumed that for all i, either ri=1 or ni=1. It is a requirement for the correctness of some but not all of the operations that can be performed on a tile tensor.

Processing proceeds to operation S265, where replicate module 302 replicates the tensor A1. The tensor is replicated ri times along each dimension i to thereby obtain tensor A2. The new tensor has shape [n1*r1,n2*r2, ..., nk*rk]. The element at zero-based indices (i1,i2, ..., ik) of tensor A2 is equal to the element (i1 mod n1, i2 mod n2, ..., ik mod nk) of A1, where mod is the "modulo" operator.

Processing proceeds to operation S270, where allocate module 304 allocates a number of tiles in RAM 230. In this example, the memory with the tile related restriction is a random access memory. Alternatively, it could be other types of memory, such as memory of an on-chip cache. Each tile should be capable of storing s numbers, where s is as defined above. At operation S270, we allocate tiles. The required number of tiles can be computed as follows. Let ei=ceil(ri*ni/ti), where ceil means rounding up to the nearest integer from above. The required number of tiles is e1* e2* ... *ek. This number is derived from operation S280, described below, where the computer system is required to arrange the tiles in a tensor large enough to store A2.

Processing proceeds to operation S275, where reinterpret module 306 reinterprets each tile as a tensor with dimension sizes t1, t2 ... tk. A tile T can hold s numbers which is denominated, in this example, as T[0], T[1], ..., T[s−1]. Each tile is logically reinterpreted as a tensor of k dimensions, with shape [t1,t2, ..., tk]. What "reinterpreting a tile as a tensor" means, for purposes of this document is that each element of a k dimensional tensor of dimension sizes t1,t2, ..., tk is respectively mapped to physical locations T[0], T[1], ... T[s−1]. One such formula to do this is as follows. Say (i1,i2, ..., ik) are zero-based indices to a k dimensional tensor of dimension sizes t1,t2, ..., tk. Let Pi be the product ti*t_i+1*t_i+2* ... *tk (note that by t_i+1 we mean t with index i+1), for example, P4=t4*t5*t6* ... tk. Then the machine logic of the computer system will map (i1,i2, ..., ik) to x=i1*P2+i2*P3+i3*P4+ ... i_k−1* Pk+ik ... That is, whenever the computer system is required to access the element (i1,i2, ..., ik) of the tile, the computer system will access T[x], with x computed according to the above mentioned formula. Such a technique for mapping a multi-dimensional array to a flat dimensional array is known, and sometimes referred to as row-major order, or first dimension moving last. According to some embodiments of the present invention a different mapping convention of column-major, or first dimension moving first, can be employed as well, with simple adjustments to other parts. It is noted that this step is a mapping step and entails the action, or operation, of mapping and/or creating a map. Also note that the mapping here and also in subsequent steps need not be physically stored in memory, but can be computed via a function whenever needed. That is, a view (or interface) can be constructed allowing to access the one-dimensional tile as a k-dimensional tensor by logically performing the mapping described above.

Processing proceeds to operation S280, where construct module 308 constructs tensor A3 such that each element of tensor A3 is a tile in RAM 230. At operation S280, construct module 308 constructs a tensor A3 such that each of its element is a tile, and combined it is large enough to hold the replicated input tensor A2. A3 is created as a multi-dimensional array with shape [e1,e2, . . . , ek], where ei are the numbers defined above. Since we interpret each tile in itself as a tensor of shape [t1,t2, . . . , tk], the total number of available slots along the i'th dimension is ei*ti=ceil(ri*ni/ti)*ti>=ri*ni. Hence the tensor of tiles we constructed can be viewed as a single multi-dimensional array of shape [e1*t1, e2*t2, . . . , ek*tk], having enough slots to store the replicated tensor A2.

Processing proceeds to operation S285, where mapping module 310 computes a mapping between elements of tensor A2 and elements of tensor A3. At operation S285, module 310 computes mapping: the element at zero based indices (j1,j2, . . . , jk) of A2 is mapped to a slot of A3 with the same indices when viewed as a single multi-dimensional array of shape [e1*t1,e2*t2, . . . , ek*tk] as explained in the previous step. Formally, we first identify the tile element T of A3 which this element belongs to, which is [z1,z2, . . . , zk] where zi=floor(ji/ti), where floor is rounding down to the nearest integer from below. We then identify in which slot in T this element is mapped to, by first computing its indices in the re-interpreted version as [y1,y2, . . . , yk], where yi=ji mod ti. We then convert the multi-dimensional indices [y1,y2, . . . , yk] to a single index x according to the mapping formula described above in conjunction with step S275, and the element is mapped to T[x].

Processing proceeds to operation S290, where copy module 312 copies the data making up tensor A2 to the tiles of tensor A3. At operation S290, copy module 312 then copies elements of A2 to A3 using mapping of step 7. Some slots of A3 will not be mapped to any slot of A2, and hence we will not copy any values to those slots. Instead copy module 312 sets them to zero. These slots may be referred to as unused slots.

Processing proceeds to operation S295, where store module 314 stores packing details and tensor A1's dimensions n1, n2 . . . nk alongside the tiles of tensor A3 in RAM 230. At operation S295, store module 314 stores alongside A3 the packing details t1,t2, . . . , tk and r1,r2, . . . rk, and also the input tensor A1 shape n1,n2, . . . , nk. Together they are the tile tensor data structure. A3 is the data of the tile tensor, and we'll refer to it later as the "tensor of tiles" or "the multi-dimensional array of tiles". The additional data (the lists of ti, ri, and ni) are the meta-data, which we also sometimes call the tile tensor shape, especially in conjunction with a special human-readable notation described later on. The meta-data will allow some embodiments of the present invention to later correctly unpack and restore A1 from A3. Original tensor A1 tensor can be retrieved back from the tile tensor A3 using a process called "unpacking". The tile tensor shape is used to identify how the tensor's elements are arranged within the tiles, and copied back into a tensor. Given one or more tile tensors, operators can be applied to them. These operators may change both the content of the tiles, and the tile tensor shapes of the tile tensors.

III. Further Comments and/or Embodiments

Performing operations on tile tensors is equivalent (or "homomorphic", mathematically speaking) to directly operating on the tensors. For example, let T1 and T2 be two tensors. And let TT1 and TT2 be two tile tensors, each the result of packing of T1 and T2 respectively. Then adding TT1 and TT2 together will result with a new tile tensor TT3. Unpacking TT3 will result with a tensor T3, which is equal to T1+T2. This equivalence (or homomorphism) is true also for other operators, such as multiply, rotate, sum, and others. Using this equivalence ("homomorphic") property, computers can perform complicated sequences of operations on tile tensors, such as a sequence of matrix-vector multiplications, or neural network inference, and in the end retrieve the correct result as a tensor. Thus, for example neural network inference can be performed efficiently under encryption.

Tile tensor shapes can be used as primitives for compilers that compile a regular computation to a computation under encryption. Such compilers are known in the art. They can scan various options for tile tensor shapes describing how to pack different elements of the computation, and search for the optimal shapes.

In the following, the terms "tensor" and "multi-dimensional array" are used interchangeably. Also, a tile tensor shape may sometimes be referred to as the metadata. So, a tile tensor data set is made of two parts: the tiles that contain the data (which is referred to as the "tensor of tiles"), and the metadata which defines the packing details and is also referred to as the tile tensor shape.

An embodiment of a packing process according to the present invention is as follows. The user supplies as input a multi-dimensional array A1 with k dimensions of sizes n1,n2, . . . , nk and also packing details including two lists of integers t1, t2, . . . , tk, and r1, r2, . . . rk, each list of length k. Software instructions then replicate the input multi-dimensional array ri times along each dimension i (that is, r1 times along first dimension, r2 times along second dimension, and so on) to form multi-dimensional array A2. Software instructions then allocate multiple arrays of size s each, or other data structures allowing to store an ordered list of s numbers, which will be referred to as tiles. Each tile is then logically re-interpreting itself as a multi-dimensional array with dimensions t1, t2, . . . , tk. Software instructions combine these tiles into another multi-dimensional array A3 such that the combined size is large enough to hold the user supplied and replicated multi-dimensional array A2. Software instructions then copy A2 into the multi-dimensional array of tiles A3. The packing details t1, t2, . . . , tk, and r1, r2, . . . rk, and sizes of A1 dimensions n1,n2, . . . nk are stored as metadata, along-side the data itself with is the multi-dimensional array of tiles A3. The data and metadata together are the "tile tensor" data structure.

Figure 2:
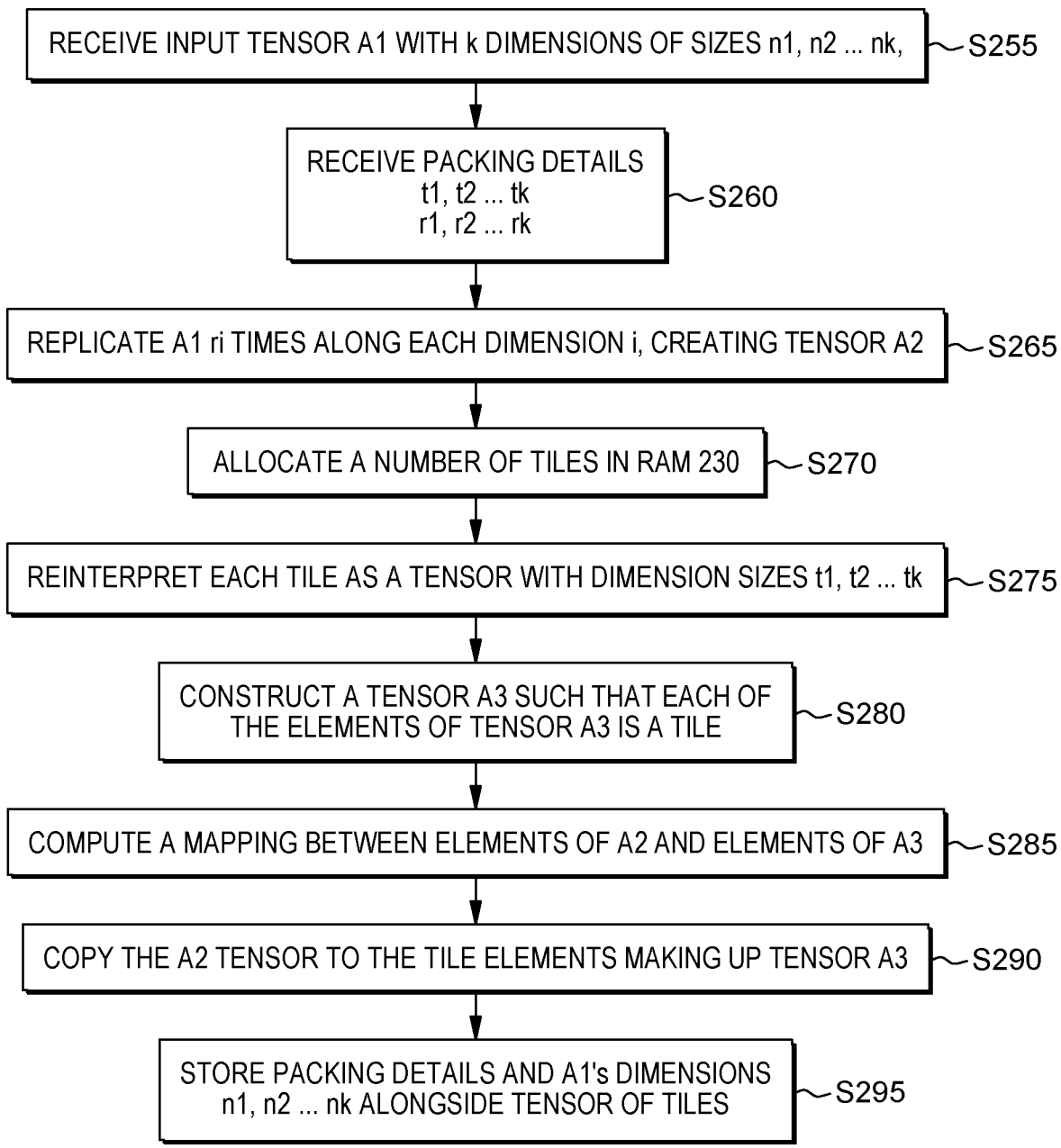
FIG. 2 is a flowchart showing a first embodiment method performed, at least in part, by the first embodiment system.
Figures 3, 4A, 4B:
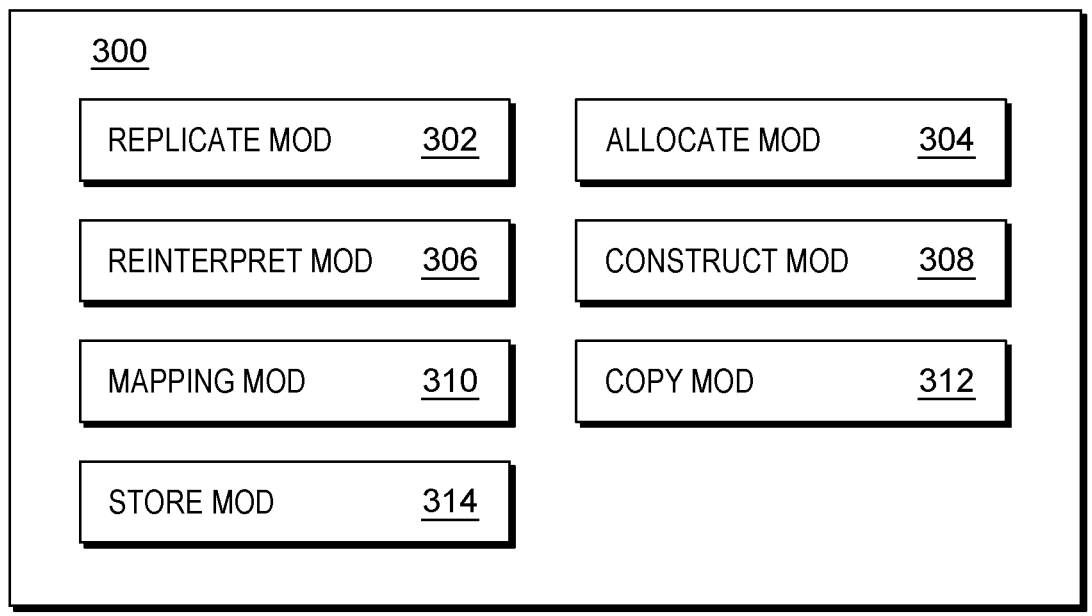
FIG. 3 is a block diagram showing a machine logic (for example, software) portion of the first embodiment system.
FIG. 4A is a data diagram showing an example of computations according to an embodiment of the present invention.
FIG. 4B is a data diagram showing an example of computations according to an embodiment of the present invention.

FIG. 4 (that is, FIGS. 4A to 4I, taken collectively) shows a concrete example of the packing algorithm described in FIG. 2. FIGS. 4A to 4I respectively show the following: 4A (an input matrix of dimensions [5,1], that is, k=2, n1=5, n2=1). It is provided as input to the packing algorithm S255, where step S260 is provided with input packing details: t1=2, t2=4, r1=1 r2=3), 4B (replicate the input 3 times along second dimension), 4C (allocate empty tiles of size 8), 4D (reinterpret them as 2 by 4 matrices), 4E (construct a tensor of tiles of 3 by 1 tiles), 4F (computing mapping, the diagram shows the mapping of the extreme corners, all other elements are mapped in between), 4G (after copying), 4H (recall the tiles are shown as 2 by 4 matrices just because we logically interpreted them this way, they really are flat arrays), and 4I (the complete tile tensor: array of tiles plus packing details and other meta data).

If a multi-dimensional array A1 was packed into a tile tensor TA1 as described in FIG. 2, then it can be retrieved back (unpacked) as follows. Software instructions construct a multi-dimensional array A2 of shape [n1,n2, . . . nk] (these values are stored as meta data inside the tile tensor). Elements from the tile tensor's TA1 tiles are copied to A2 by recomputing the same mapping as in FIG. 2 at reference numeral S285, and copying in the reverse direction (from tiles to A2), and discarding replication. A2 will be equal to A1. The replication (if any, that is, if any of the ri are larger than 1), can be discarded by either taking the first copy in each replicated dimension, or averaging together all the copies. If the copies are discarded, then there is no need to first copy all the elements to A2 and discard replication, but only to copy the first element, and skip and not copy all the replicated elements.

In some embodiments, tile tensors can be manipulated by operators by changing the content of the multi-dimensional array of tiles and the accompanying packing details and other meta data. The change is made in such a way that the operator is equivalent to applying such an operator directly tensors they contain packed inside. For example, if tensor A1 is packed inside tile tensor TA1, and tensor A2 is packed inside tile tensor TA1, then software instructions can apply the "add" operator on TA1 and TA2, obtaining a new tile tensor TA3. Unpacking TA3 will result with a tensor A3, which is equal to A1+A2.

In some embodiments, manipulation of tile tensors by operators, as in the previous paragraph, may add additional meta data to the resulting tile tensor, which is an array [u1,u2, . . . , uk], where each ui is a Boolean indicator indicating whether the unused slots along dimension i got filled with non-zero values. In the packing algorithm flowchart 250 of FIG. 2, and more specifically in the discussion of operation S290, it was mentioned that some slots of the tensor of tiles are unused, since they are not mapped to any element of the input data. They are set to 0 in this case. However, after manipulation they may get filled with 'junk' data. They are still unused, but they don't contain zeros anymore and it is important to keep track of it. The additional meta data [u1, . . . , uk] stored alongside the tile tensor indicates whether this has happened along each dimension i. FIG. 10 shows an example of a tile tensor with unknown value indicators. It contains a matrix M1=[0,1,2, 3,4,5; 10,11,12,13,14,15; 20,21,22,23,24,25; 30,31,32,33, 34,35; 40,41,42,43,44,45] (the matrix rows are separated by ";") packed inside. Since it has u2=true, the unused slot along the second dimension are not necessarily set to zero, and may contain junk values. The question marks in FIG. 10 indicate unused slots where the value is unknown (not initialized to zero).

The summation operator is an example of an operator changing the content of the multi-dimensional array of tiles and the accompanying packing details and other meta data. Software instructions receive as input a tile tensor and a dimension j to sum over. First, software instructions sum over the multi-dimensional array of tiles by adding tiles together. Then, software instructions sum inside the tiles using repeated rotate-and-sum algorithm, with base rotation offset of t_(j+1)*t_(j+2)* . . . *t_k (that is, a product of ti where i starts at j+1 and ends at k. Note that by t_j+i) what is meant is the (j+i)'th element in the list [t1,t2, . . . , tk]). Then software instructions update the packing details as follows: software instructions set nj=1. if tj is the lowest j such that tj>1, then software instructions set rj=tj, otherwise we set rj=1 and uj=true.

Figure 4C:
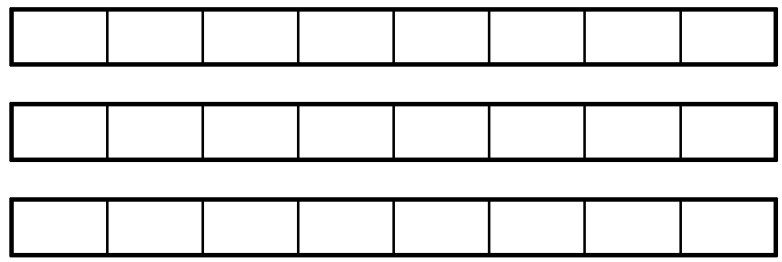
FIG. 4C is a data diagram showing an example of computations according to an embodiment of the present invention.
Figure 4D:
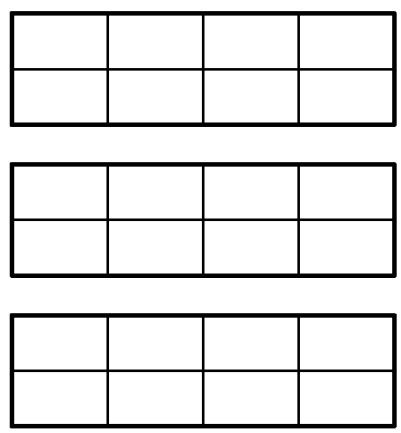
FIG. 4D is a data diagram showing an example of computations according to an embodiment of the present invention.
Figure 4E:
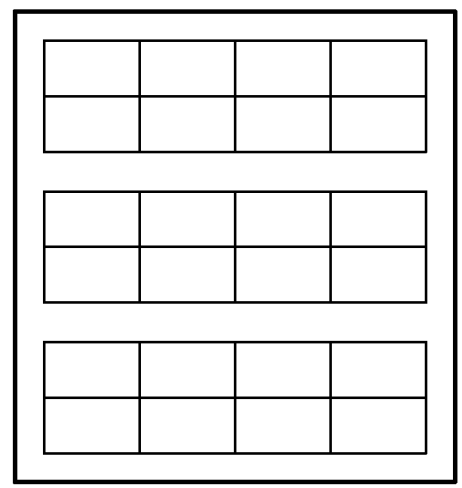
FIG. 4E is a data diagram showing an example of computations according to an embodiment of the present invention.
Figure 4F:
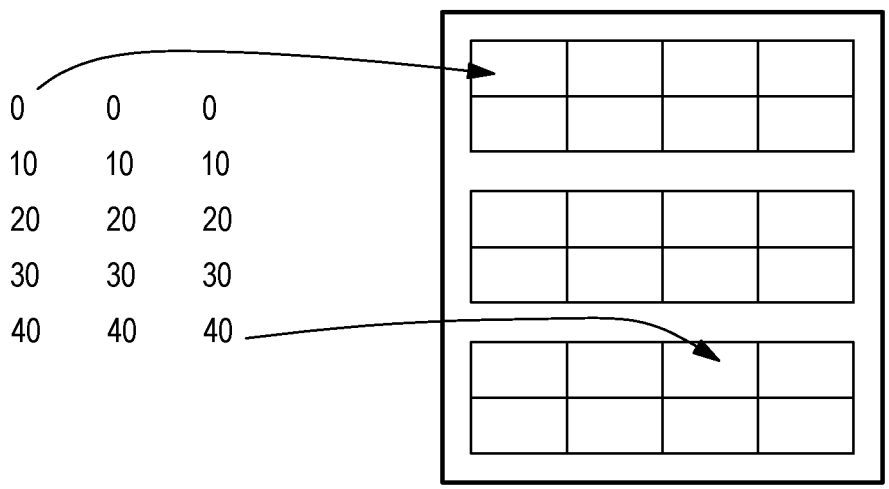
FIG. 4F is a data diagram showing an example of computations according to an embodiment of the present invention.
Figure 4G:
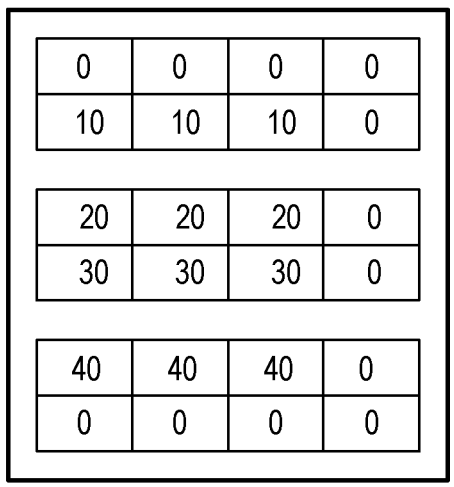
FIG. 4G is a data diagram showing an example of computations according to an embodiment of the present invention.
Figure 4H:
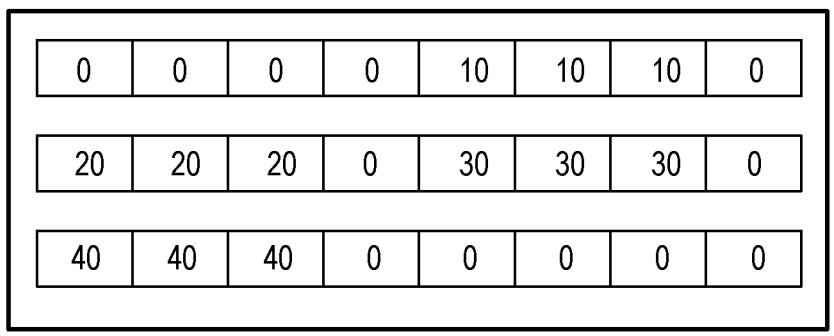
FIG. 4H is a data diagram showing an example of computations according to an embodiment of the present invention.
Figures 4I, 5:
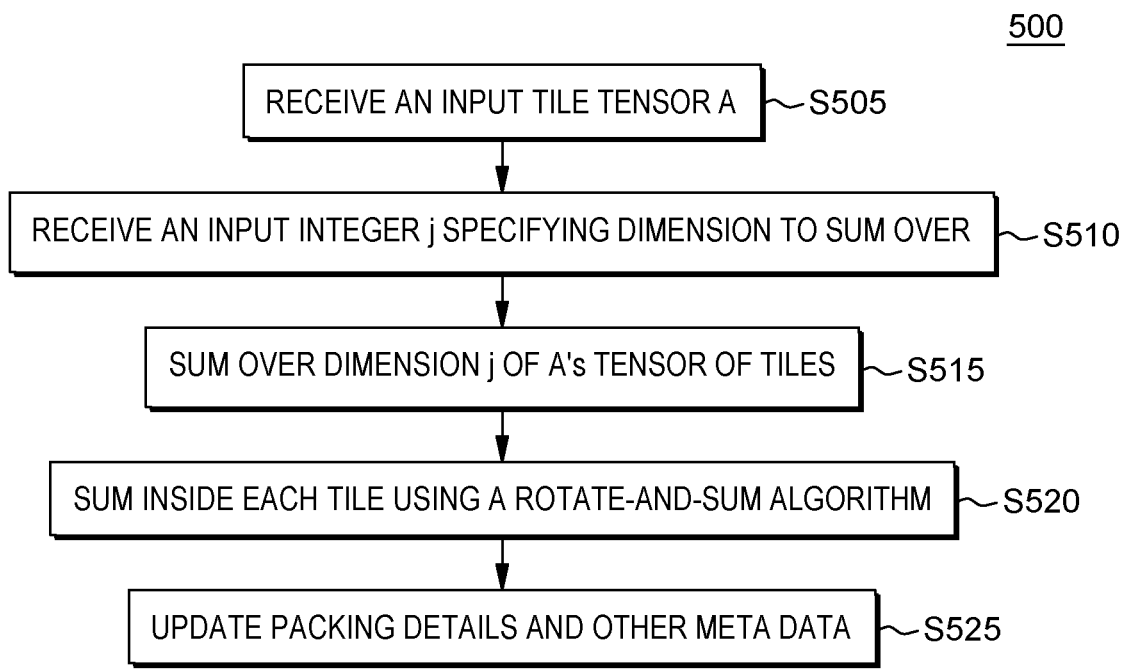
FIG. 4I is a data diagram showing an example of computations according to an embodiment of the present invention.
FIG. 5 is a flowchart showing a second embodiment method.

As shown in FIG. 5, flowchart 500 represents a summation operator process, which will be discussed in the following five (5) paragraphs.

OERATION S505: software instructions receive the input tile tensor A, containing a tensor of tiles A1 and packing details and meta data [t1,t2 . . . , tk], [r1,r2, . . . , rk], [n1, . . . , nk]. Optionally also [u1, . . . , uk].

OPERATION S510: software instructions also receive as input an integer j specifying a dimension, 1<=j<=k.

OPERATION S515: software instructions sum over the tensor of tiles A1 along dimension j. This is done by usual way of summing over a dimension of a tensor as follows. We compute a new tensor of tiles A2. Let the shape of A1 be [e1,e2, . . . , ek], that is, it is a multi-dimensional array of tiles having e1 tiles along the first dimension, e2 along the second dimension, and so on. A2 we'll have a shape [e1', e2', . . . , ek'] such that ei'=ei for all i, except for ej=1. That is, the dimension size along the j'th dimension is reduced to one. The tile at zero based indices [x1,x2, . . . , xk] of A2 will be the sum of all tiles at positions [y1,y2, . . . , yk] of A1, where yi=xi for all i except i=j. The index yj will range from 0 to ej−1 (that is, the entire range of the j'th dimension). The tiles are added together using an add operator that sums them elementwise. The new tensor of tiles A2 replaces A1 as the tensor of tiles of A.

OPERATION S520: For each tile T of A2, software instructions sum inside the tile as follows. Some embodiments use a known rotate-and-sum algorithm, which performs a series of operations T=T+rot(T,o), T=T+rot(T,2*o), . . . , T=T+rot(T,4*o), . . . , T=T+rot(T,(tj/2)*). that is, in the first step software instructions add to T (elementwise) a rotated copy of it, rotated by offset o. With each additional step we multiply the offset by 2. Since we want to sum along dimension j, and by the way the tiles are reinterpreted as multi-dimensional array, the base offset o is selected to be o=t_(j+1)*t_j+2)* . . . *t_k. The maximal offset should be equal to tj/2*o. If tj is not a power of 2, a more complicated algorithm based on efficient evaluation of powers can be used, but not described here. Such an algorithm is known in the art. An example of this rotate-and-sum algorithm will be further discussed below.

OPERATION S525: software instructions update the packing details as follows. First, we set nj to 1. Next, if j is the smallest integer such that tj>1, then we set rj=tj, otherwise we set rj=1, and uj=true. Note that if the tile tensor A did not already contain the Boolean indicators [u1, . . . , uk] then software instructions add them first all initialized to false except uj=true.

Note that unpacking the tile tensor after summation will retrieve the original tensor after summation, for example, the summation can be thought of as acting on the original tensor packed inside. Note further that this method will only work if the input tile tensor A has rj=1, and either no Boolean indicators [u1, . . . , uk], or uj=false. In the case uj=true, the algorithm described above can be remedied to work in a simple way clear for anyone trained in the art, hence we skip it here.

FIGS. 6 (that is, FIGS. 6A, 6B and 6C) and 7 (that is, FIGS. 7A and 7B) show examples for input and outputs of the summation operator. FIG. 6A, shows an input tile tensor A. The other input to summation is a dimension to sum over j=1 (not shown in the Figure). In FIG. 6B, A's tensor of tiles is shown as it looks like after operation S515, summing over tensor of tiles. FIG. 6C, shows the output tile tensor of the summation operator (after step S525). FIG. 7A shows the input tile tensor A. The other input to the summation operator is the dimension to sum over j=2 (not shown in the Figure). FIG. 7B shows the output tile tensor of the summation operator (after operation S525).

An example of the rotate and sum algorithm used in operation S520 will now be discussed. Let T be a tile of length 8, containing T=[1,2,3,4,5,6,7,8] and let the base offset be o=1. After rotation by one, the following is obtained: rot(T,1)=[2,3,4,5,6,7,8,1]. Performing T=T+rot(T, 1), the following is obtained: [3,5,7,9,11,13,15,9].Note that the first element is now the sum of the first two elements in the original T, that is, 3=1+2. Repeating this again with a double offset, and computing T=T+rot(T,2), the following is obtained: T=[10,14,18,22,26,22,18,14]. Repeating again with a double offset T=T+rot(T,4), the following is obtained: T=[36,36,36,36,36,36,36,36]. Now the first and all elements are equal to the sum of all elements in the original T (since 1+2+3+4+5+6+7+8=36).

T is now reinterpreted as a two-dimensional array t1=2 and t2=4. Assuming the original value T=[1,2,3,4,5,6,7,8], so now T is reinterpreted as a matrix with two rows [1,2,3,4], and [5,6,7,8]. Summing over the first dimension, according to operation S520 the base offset is o=4, and the summation involves one step: T=T+rot(T,4). The processing stops here since t1/2=1. The following is obtained: T=[6,8,10,12,6,8,10,12]. Note that re-interpreted as a matrix, each row is [6,8,10,12], so it can be viewed as the same row replicated twice. This is why in operation S525, the following settings are set: n1=1 and r1=t1=2.

If, instead, a sum is taken over the second dimension, the base offset is o=1. We'll perform two steps: T=T+rot(T,1), T=T+rot (T,2), and atop here since t2/2=2. The result is T=[10,14,18,22,26,22,18,14]. Re-interpreted as a matrix the first row is [10,14,18,22] and the second [26,22,18,14]. Note that the first element in each row: 10 and 26 respectively, are the sum of all elements in the original rows of the re-interpretation of T, 10=1+2+3+4, and 26=5+6+7+8. The rest of the values are meaningless. This is why in operation S525, the following settings are set: n2=1, and u2=true. These properties demonstrated here by examples can be shown to hold generally, according to the rules specified within the summation operator.

Elementwise operators (that is, ADD and MULTIPLY) are an example of operators changing the content of the multi-dimensional array of tiles and the accompanying packing details and other meta data. Software instructions receive as input tile tensors A and B. First, software instructions check their meta data compatibility, by requiring both have the same values for [t1,t2, . . . , tk], and for each i where their value for ni mismatch, at least one of them has ni=1, and ri=ti. Second, for each i where the dimension size of the multi-dimensional arrays of tiles of A and B mismatch, software instructions replicate the smaller one to be as large as the larger one. Third, software instructions apply the operator (add or multiply) to their respective multi-dimensional array of tiles by applying the operator on corresponding tiles. Then we update the packing details as follows. Software instructions set the resulting [n1,n2, . . . , nk] such that each nj is the maximum of the corresponding inputs values of nj. The resulting [r1, . . . , rk] are the minimums. The [t1, . . . , tk] remain the same. Software instructions add indications [u1, . . . , uk], with values deduced by whether unused slots with non-zero values are created.

Figure 8:
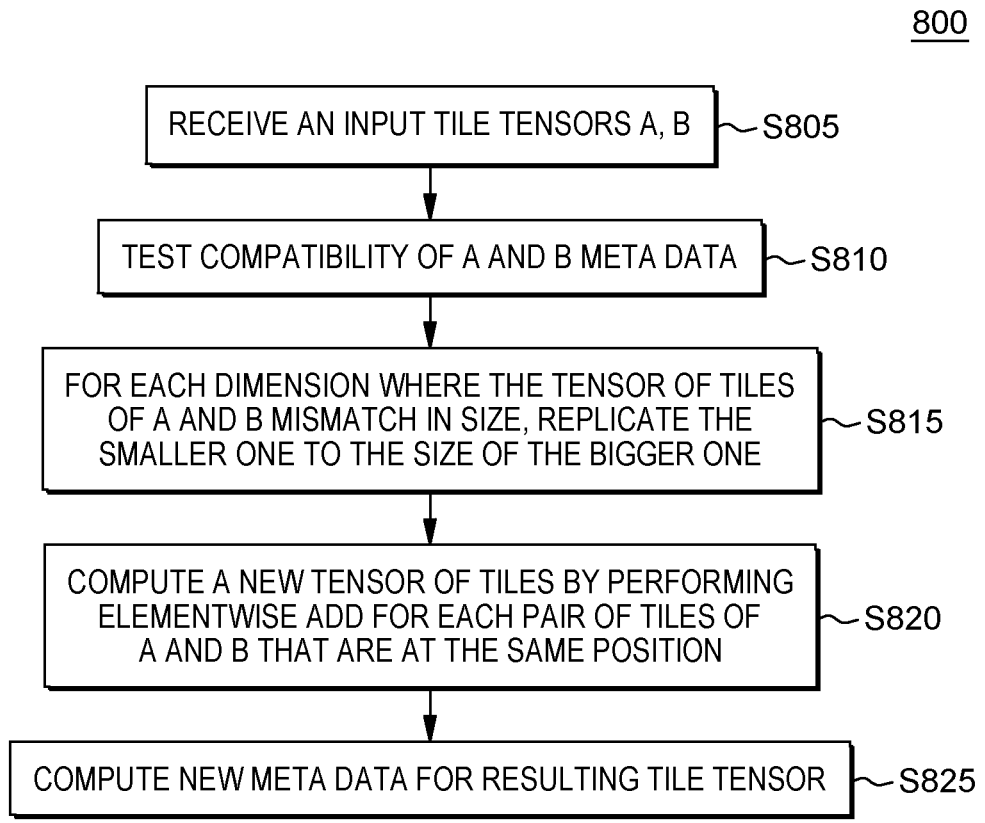
FIG. 8 is a flowchart showing a second embodiment method.

As shown in FIG. 8, flowchart 800 represents a method for an elementwise "add" operator of a tile tensor. This method will be described in the following five (5) paragraphs.

OPERATION S805: software instructions receive two input tile tensors A and B.

OPERATION S810: Software instructions test compatibility in meta data. Let A's meta data be [n1,n2, . . . , nk], [t1,t2, . . . , tk], and [r1,r2, . . . , rk], and B's meta data: [n1',n2', . . . , nk'], [t1',t2', . . . , tk'], and [r1',r2', . . . , rk']. It is required that ti=ti' for all i. It is further required that that for all i either ni=ni' or (ni=1 and ri=ti) or (ni'=1 and ri'=ti'). Note also that this operator assumes an aforementioned assumption that for all i either ni=1 or ri=1 for both inputs.

OPERATION S815: The tensors of tiles of A and B have shapes [e1,e2, . . . , ek] and [e1',e2', . . . , ek'] respectively. For any i such that ei is not equal to ei', our assumptions and computability checks imply that either ei=1 or ei'=1. If ei=1, then we'll replicate it ei' times to match in size, and vice versa.

OPERATION S820: software instructions now add corresponding tiles of A and B together. That is software instructions take a tile T1 at position [x1,x2, . . . , xk] in A's tensor of tiles, and add to it a tile T2 at the same position in B's tensor of tiles. (note that after step 3 they have the same shape). The result is a single tile tensor C containing the sum of A and B. The add operation on tiles here can be replaced by multiply, or other elementwise operators on tiles, to support multiply or other elementwise operators on tile tensors.

OPERATION S825: software instructions compute the new meta data of the resulting tile tensor as follows. Let the meta data of A and B be as defined in step 2. The resulting meta data is [n1",n2", . . . , nk" ] such that ni"=max(ni,ni'), [t1",t2", . . . tk" ] such that ti"=ti, [r1",r2", . . . , rk" ] such that ri"=min(ri,ri'). Software instructions also add [u1", u2", . . . uk" ] meta data, or compute it taking into account the ui's of the inputs if they included in inputs. It can be deduced by a general rule: we know which slots are unused in each of the inputs A and B, and in the output C. If A and B had ui indicators, we know which of those slots had non-zero unknown values. If either A or B has no ui indicators, then all of their unused slots are zeroes. Therefore, for each unused slot of C we can deduce whether it's zero or not based on the two corresponding input slots, and whether they contained zero or not, and the nature of the operator performed. For any dimension i for which there exists an unused slot that is not necessarily zero, we set ui"=true. For example, for the add operator, ui"=true if either A or B had ui=true, or if the extent of unused slots along dimension i differs in A and B.

FIGS. 9A, 9B, 9C and 9D show a specific example of adding two tile tensors. The input A contains a matrix M1=[0,1,2,3,4,5; 10,11,12,13,14,15; 20,21,22,23,24,25; 30,31,32,33,34,35; 40,41,42,43,44,45] (the matrix rows are separated by ";") packed inside (FIG. 9A). The input B contains a matrix with a single row M2=[100,101,102,103, 104,105] packed inside (FIG. 9B). FIG. 9C shows tile tensor B after being modified by step S815, that is, its tensor of tiles is replicated so as to match in size that of A. The result C (FIG. 9D) contains a matrix M3=[100,102,104,106,108,110; 110,112,114,116,118,120; 120,122,124,126,128,130; 130, 132,134,136,138,140; 140,142,144,146,148,150] packed inside. Note that M3=M1+M2, but since M1 and M2's sizes mismatch, M2 is replicated to 5 rows to match M1. This is the same as adding the single row of M2 to all rows of M1.

The set of possible elementwise operators mentioned above (that is, ADD and MULTIPLY, of which the "ADD" example was shown in detail) can be extended to any other elementwise operator that can be applied to tiles, by employing it in step S820. The elementwise operator related methods described herein can be adapted by a person trained in the art to work with other assumptions on meta data or different compatibility tests on meta data.

Tensor contraction operator operators are an example of operators changing the content of the multi-dimensional array of tiles and the accompanying packing details and other meta data. Given two tile tensors A and B, software instructions can perform tensor contraction by performing elementwise multiplication as discussed above, then summation over the dimension to be contracted as discussed above. The tile tensors should be appropriately packed to pass the compatibility test discussed above, which compatibility test is: have both A and B contain the same number of dimensions, and set for each of them and ni=1 and ri=ti for each dimension not included in the original tensor packed inside.

For example, let T1 a tensor with shape [a,b,c], and T2 a tensor with shape [c,d,e]. So, the common dimension is c, and we'll compute tensor contraction along this dimension. We'll pack both of them in tile tensors AT1 and AT2 having each 5 dimensions. T1 will be reshaped to [a,b,c,1,1] before packing, and set r1=1, r2=1,r3=1,r4=t4,r5=t5. T2 will be reshaped [1,1,c,d,e] before packing, and set r1=t1,r2=t2, r3=1,r4=1,r5=1. The values of [t1,t2,t3,t4,t5] can be chosen arbitrarily, but consistently for both AT1 and AT2. Now we can multiply AT1*AT2=C using the elementwise multiplication operator, and then sum over the third dimension of C to obtain the result containing the tensor contraction of T1 and T2 along dimension c.

Examples of special cases of tensor contraction are inner product between vectors, matrix-vector or vector-matrix multiplication, and matrix-matrix multiplication.

In some embodiments, the tensor contraction operator takes the form of matrix-vector multiplication. Given two tile tensors A and B, that contained packed inside a matrix M and a vector V, software instructions can perform matrix-vector multiplication by performing elementwise multiplication as discussed above, then summation over the dimension to be contracted as discussed above. The tile tensors should be appropriately packed to pass the compatibility test discussed above.

As an example, let M be a matrix of shape [5,6]. Software instructions pack it into a tile tensor A1 with r1=1 and r2=1. Let V be a vector of shape [6]. Software instructions first reshape it [1,6], and pack it into a tile tensor A2 with r1=t1 and r2=1. The value of [t1,t2] can be chosen arbitrarily but consistently for both A1 and A2. Now software instructions can multiply A1*A2=C using the elementwise multiplication operator, and then sum over the second dimension of C to obtain the a result containing the matrix vector multiplication M*V.

In some embodiments, the packing details and meta data associated with a tile tensor can be written in concise notation we term "tile tensor shape" as follows: a comma separate list of dimension data, where for each dimension we specify the following. ni,ri and ti are denoted "ni*ri/ti". If ri=1 then it can be omitted together with the "*" symbol. If ri=ti then the value of ri can be omitted. If ni=1 then it can be omitted. If ti=1 then it can be omitted together with the "/" symbol. If the ui indicators exist, and ui=true, then a "?" symbol is added.

For example, if k=3, and n1=10,n2=1,n3=8, t1=1,t2=16, t3=32, r1=1, r2=16,r3=1, u1=false, u2=false, u3=true, then the tile tensor shape is [10*1/1,1*16/16,8*1?/32], or after the allowed omissions, [10,*/16,8?/32].

In some embodiments, tile tensors can be used to efficiently multiply an input vector V1 by a series of input matrices M1,M2, . . . Mn, where the output of one multiplication is the input vector to the next. The input vectors and matrices are all packed to tile tensors AV1, AM1, . . . , AMn, with k=2, and the same values for [t1,t2]. The input V1 is reshaped to a single column matrix and packed to AV1, with r1=1, and r2=t2. The first matrix M1 is packed transposed to AM1 with r1=1 and r2=1. Multiplication between AM1 and AV1 is done via tensor contraction of as described above, which uses the summation of as described above, which therefore results with output vector AV2 as packed single-row matrix, with r1=t1 and r2=1. The second matrix is packed to AM2 with r1=1 and r2=1, so after tensor contraction with AV2 the result is a single row-column matrix packed to AV3 with r1=1 and r2=1 and u1=false and u2=true. The unknown values indicated by u2 are cleaned by multiplying with a zero-one mask. The first dimension is replicated by rotate-and-add algorithm, resulting with r2=t2. Using rotate-and-add algorithm for replicating is similar to its usage for summation, as explained previously. Since AV3 now has similar meta data to AV1, we can repeat this process with additional matrices, where each odd-index matrix is treated similarly to M1, that is, packed after transposing it, and each even-index matrix treated similarly to M2, that is, packed without first transposing it.

For example, let V1 be a vector of length 40. M1 a matrix with shape [30,40]. M2 matrix with shape [20,30], and M3 a matrix with shape [10,20]. We want to compute V4=M3* (M2*(M1*v1))). Let's assume there are tiles of size 32. We'll choose to use t1=4, t2=8 as an example. Using the tile tensor shape notation described above, the method for consecutive matrix vector multiplication works as follows: V1 will be packed to tile tensor AV1 using tile tensor shape [40/4,*/8]. Matrices M1, M2, and M3, will be packed to AM1, AM2, AM3 with tile tensor shapes [40/4,30/8], [20/4,30/8],[20/4,10/8]. Note that M1 and M3 were transposed prior to packing.

The output of AM1*AV1 is AV2 with tile tensor shape [*/4,30/8]. The output of AM2*AV2 is AV3 with tile tensor shape [20/4,1?/8]. We'll multiply it with a mask containing 1 for each used slot, and 0 for each unused slot, thus cleaning the unknown values in unused slots, resulting with tile tensor shape [20/4,1/8]. Software instructions then follow an algorithm similar to the summation algorithm, but rotating in the opposite direction, which will result with replicating the data across a dimension. Doing this for the second dimension will result with tile tensor shape [20/4,*/8]. We'll now compute AM3*AV3 resulting with AV4 with tile tensor shape [*/4, 10/8]. Unpacking AV4 will result with the correct result V4.

In some embodiments, the previously discussed method is extended by adding additional dimensions that are not contracted, allowing a series of multiplications with higher-dimensional tensors. In some embodiments, a previously discussed method is used for neural network inference for a batch of inputs with layers that perform matrix-vector multiplication, or that their operation can be reduced to matrix-vector multiplication, and arbitrary activation functions. The input batch of vectors to the neural network and the weight matrices of the layers will all be packed to tile tensors with the same values for t1, t2 and t3. The first two dimensions will be used as discussed above. The input batch dimension will be the third dimension. The neural network layer weight matrices will be have a third dimension n3=1, but replicated r3=t3.

For example, consider a neural network with 3 fully connected layers. Each of them with square activation layer. The first layer receives as input a vector of length 40, and outputs a vector of length 30. The second layer, input a vector of length 30, and outputs a vector of length 20. The third layer, input a vector of length 20, and outputs a vector of length 10. Therefore, their weight matrices have the same shapes as in the example in paragraph 77, and the computation proceeds in the same way, except having a third dimension, and for the activation functions. In batch of 5 inputs, each a vector of length 40 will be packed using tile tensor shape [40/t1,*/t2,5/t3]. The first fully connected layer's matrix of size [30,40], will be transposed, then packed using tile tensor shape [40/t1,30/t2,*/t3], and similarly all other weight matrices will have a replicated third dimension. The computation will proceed by a series of tensor contraction similarly to before, where similarly to before the contraction is done on either the first or second dimension, but not on the third. The final output result will have tile tensor shape of [*/t1,10/t2,5/t3]. Unpacking it will retrieve a batch of 5 outputs, each a vector of length 10. Also, the activation layers need to be computed in between the matrix-vector multiplications. But since the activation functions simply operate on each slot separately, software instructions can simply execute them on the tile tensor, tile by tile. In this example, squaring each tile, since we chose a square activation layer.

This method has several potential advantages. First, it allows choosing t3 so as to match the required batch size. Second, choosing high value of t3 allows for high throughput, since it allows running a large batch, and reduce number of rotations involved in tensor contractions. Choosing a low value of t3 reduces memory consumption, and reduces latency by processing a smaller batch. Lastly, the values for t1, t2, and t3 can be optimized automatically, as will be discussed in the next paragraph.

In some embodiments, compilers that compile some computation to homomorphically encrypted computation can use tile tensor shapes for automatic optimizations. A range of maximal dimension count k to scan will be defined, and the tile size s. For each tensor in the computation a tile tensor shape will be automatically selected by either brute force search, or using known optimization search techniques. Such compilers are known in the art. For example, such compilers exist that take a neural network inference engine, and convert its code to use homomorphic encryption ciphertexts and operations on those ciphertexts, such that the entire computation is done under encryption. Such compilers can use tile tensor shapes to decide how to pack each element of the network, and the input. They can track how tile tensor shapes change based on the rules as specified for operators discussed above. They can verify a validity of a particular assignment by checking the constraints of each particular operator that needs to be performed, for example, the compatibility test discussed above. They can evaluate the performance of a particular assignment either by running it and taking measures, or by some analytic formula counting the number of operations involved, and estimating the expected run time. They can select the optimal tile tensor shape assignment either by a brute force scan of a particular specified range, for example, all valid tile tensor shapes up to dimension size k=10. Or use known optimization search technique that use various heuristics to speed up this search.

Some embodiments of the present invention may include one, or more, of the following operations, features, characteristics and/or advantages: (i) the user can supply a "tile tensor shape", which is meta data describing the packing scheme; (ii) an easy to use language for describing this meta data in a human and machine-readable format; and/or (iii) deals with application of tile tensors for matrix-vector multiplication, neural network inference, and compilers for homomorphic encryption.

Some embodiments of the present invention may include one, or more, of the following operations, features, characteristics and/or advantages: (i) a general technique to pack n dimensional array to n dimensional chunks, where the user can specify any dimension to be replicated; (ii) a single algorithm for summing over dimension i of an n-dimensional tile, and extending it to n-dimensional array of tiles, thus extending it to sum over a tile tensor; (iii) a general technique tensor contractions that extends to any number of dimensions (this is useful for example in the context of neural network inference); (iv) ability to efficiently compute matrix-matrix multiplication, and consecutive sequence of; (v) maintains the encrypted data alongside meta data describing the packing details, and having operators that act on both; (vi) human-readable notation for describing the meta data; and/or (vii) automatic optimizations.

Some embodiments of the present invention may include one, or more, of the following operations, features, characteristics and/or advantages: (i) packs a matrix by dividing it to smaller equally-sized sub-matrices chunks so as to fit a ciphertext size; (ii) a general technique to pack n dimensional array to n dimensional chunks, where the user can specify any dimension to be replicated; (iii) a single algorithm for summing over dimension k of an n-dimensional tile, and extend it to n-dimensional array of tiles; (iv) a general technique that extends to higher dimensions; (v) this is useful for example in the context of neural network inference, as explained above; (vi) a more general technique to compute matrix-matrix multiplication; (vii) maintaining the encrypted data alongside meta data describing the packing details, and having operators that act on both; and/or (viii) human-readable notation for describing the metadata; (ix) automatic optimizations as may be described above.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Set of thing(s): does not include the null set; "set of thing(s)" means that there exist at least one of the thing, and possibly more; for example, a set of computer(s) means at least one computer and possibly more.

Virtualized computing environments (VCEs): VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Tile tensor: refers to a specific way of packing tensors into tiles, with specific meta data added, as explained above in connection with various embodiments of the present invention; the tensors involved in the context of homomorphic encryption ciphertexts (computations under encryption) can be packed into tile tensors so that the requisite mathematical operations can be performed on the tile tensors, as explained above in connection with various embodiments of the present invention.

What is claimed is:

1. A computer implemented method (CIM) comprising:
   receiving an input tensor;
   receiving input tensor metadata including: (i) an integer value k which is equal to a number of dimensions that characterize the input tensor, and (ii) a set of integer values, $n_1, n_2, n_k$ that respectively characterize the size of each of the k dimensions of the input tensor;
   receiving packing details for an output tile tensor including information indicative of: (i) a first set of k packing values, $t_1, t_2 \ldots t_k$, that represent tile dimension sizes for the output tile tensor data structure, and (ii) a second set of k packing values, ri, $r_2 \ldots r_k$, that respectively represent replication counts for each dimension of the input tensor;
   replicating the input tensor in a computer memory device to obtain an intermediate tensor, with each given dimension of the k dimensions of the input tensor being replicated a number of times equal to the replication count value respectively corresponding to the given dimension, so that the intermediate tensor has a shape characterized by $n_1 * r_1, n_2 * r_2 \ldots n_k * r_k$ such that an element at zero-based indices $(i_1, i_2, \ldots, i_k)$ of the intermediate tensor is equal to the element of the input tensor with indices as given by the following mathematical expressions: $i_1$ modulo $n_1$, $i_2$ modulo $n_2 \ldots i_k$ modulo $n_k$;
   allocating a plurality of tiles in the computer memory device, with tile each tile including a sufficient number of memory cells to be capable of storing s numbers;
   for each given tile T of a plurality of tiles, mapping each location of a plurality of locations of the given tile T in the computer memory device T[0], T[1], ... T[s−1], to indices of a tensor that is characterized by dimension sizes equal to the first set of k packing values, $t_1, t_2 \ldots t_k$;
   constructing from said tiles the output tensor of tiles as a data structure in the computer memory device;
   computing a mapping between elements of the intermediate tensor and elements of the output tensor of tiles; and
   copying the data making up the intermediate tensor to the output tensor of tiles data structure in the computer memory device.

2. The CIM of claim 1 further comprising:
   storing the packing details as output tile tensor metadata alongside the output tensor of tiles to form a full tile tensor output in the computer memory device.

3. The CIM of claim 2 further comprising:
   unpacking the input tensor from the output tile tensor stored in the computer memory device based on the output tensor of tiles and the metadata; and
   restoring the input tensor based on the output tensor of tiles and the metadata.

4. The CIM of claim 2 further comprising:
   generating a human understandable presentation of the output tile tensor metadata.

5. The CIM of claim 2 further comprising:
   applying a summation algorithm that sums over tiles and then sum inside tiles over a selected dimension of the output tile tensor.

6. The CIM of claim 2 further comprising: applying at least one elementwise operator of addition or multiplication of two output tile tensors.

7. The CIM of claim 5 further including further processing the output of the summation algorithm by performing at least one of the following operations:
   unpacking the input tensor from the output tile tensor stored in the computer memory device based on the output tensor of tiles and the metadata; and/or
   restoring the input tensor based on the output tensor of tiles and the metadata; and/or
   generating a human understandable presentation of the output tile tensor metadata; and/or
   applying a summation algorithm that sums over tiles and then sum inside tiles over a selected dimension of the output tile tensor; and/or applying at least one elementwise operator of addition or multiplication of two output tile tensors.

8. The CIM of claim 6 wherein the output of a plurality of elementwise operators can be further processed as a tile tensor by performing at least one of the following operations:
   unpacking the input tensor from the output tile tensor stored in the computer memory device based on the output tensor of tiles and the metadata; and/or
   restoring the input tensor based on the output tensor of tiles and the metadata; and/or
   generating a human understandable presentation of the output tile tensor metadata; and/or
   applying a summation algorithm that sums over tiles and then sum inside tiles over a selected dimension of the output tile tensor; and/or applying at least one elementwise operator of addition or multiplication of two output tile tensors.

9. The CIM of claim 2 further comprising: applying at least one elementwise operator to the two output tile tensors.

10. The CIM of claim 6 wherein a multiplication operator is applied, followed by a summation algorithm by summing over tiles then summing inside tiles, to compute a tensor contraction operator.

11. The CIM of claim 10 further comprising:
    using a tensor contraction operator as part of a neural network inference.

12. The CIM of claim 1 further comprising:
    automatically optimizing the input packing details.

13. The CIM of claim 1 where the tiles are homomorphic encryption ciphertexts.

14. The CIM of claim 5 wherein the summation algorithm further adds additional metadata of Boolean indicators for unknown values.

15. The CIM of claim 6 wherein the elementwise operators further add additional metadata of Boolean indicators for unknown values.

16. A computer program product (CPP) comprising:
a set of storage device(s); and
computer code stored collectively in the set of storage device(s), with the computer code including data and instructions to cause a processor(s) set to perform at least the following operations:
receiving an input tensor,
receiving input tensor metadata including: (i) an integer value k which is equal to a number of dimensions that characterize the input tensor, and (ii) a set of integer values, $n_1$, $n_2$, $n_k$ that respectively characterize the size of each of the k dimensions of the input tensor,
receiving packing details for an output tile tensor including information indicative of: (i) a first set of k packing values, $t_1$, $t_2$ . . . $t_k$, that represent tile dimension sizes for the output tile tensor data structure, and (ii) a second set of k packing values, $r_1$, $r_2$ . . . $r_k$, that respectively represent replication counts for each dimension of the input tensor,
replicating the input tensor in a computer memory device to obtain an intermediate tensor, with each given dimension of the k dimensions of the input tensor being replicated a number of times equal to the replication count value respectively corresponding to the given dimension, so that the intermediate tensor has a shape characterized by $n_1*r_1$, $n_2*r_2$ . . . $n_k*r_k$ such that an element at zero-based indices ($i_1$, $i_2$, . . . , $i_k$) of the intermediate tensor is equal to the element of the input tensor with indices as given by the following mathematical expressions: $i_1$ modulo $n_1$, $i_2$ modulo $n_2$ . . . $i_k$ modulo $n_k$,
allocating a plurality of tiles in the computer memory device, with tile each tile including a sufficient number of memory cells to be capable of storing s numbers,
for each given tile T of a plurality of tiles, mapping each location of a plurality of locations of the given tile T in the computer memory device T[0], T[1], . . . T[s−1], to indices of a tensor that is characterized by dimension sizes equal to the first set of k packing values, $t_1$, $t_2$ . . . $t_k$,
constructing the output tensor of tiles as a data structure in the computer memory device,
computing a mapping between elements of the intermediate tensor and elements of the output tensor of tiles, and
copying the data making up the intermediate tensor to the output tensor of tiles data structure in the computer memory device.

17. The CPP of claim 16 wherein the computer code further includes data and/or instructions for causing the processor(s) set to perform the following operations:
storing the packing details as output tile tensor metadata alongside the output tensor of tiles to form a full tile tensor output in the computer memory device.

18. The CPP of claim 17 further comprising:
unpacking the input tensor from the output tile tensor stored in the computer memory device based on the output tensor of tiles and the metadata; and
restoring the input tensor based on the output tensor of tiles and the metadata.

19. A computer system (CS) comprising:
a processor(s) set;
a set of storage device(s); and
computer code stored collectively in the set of storage device(s), with the computer code including data and instructions to cause the processor(s) set to perform at least the following operations:
receiving an input tensor,
receiving input tensor metadata including: (i) an integer value k which is equal to a number of dimensions that characterize the input tensor, and (ii) a set of integer values, $n_1$, $n_2$, $n_k$ that respectively characterize the size of each of the k dimensions of the input tensor,
receiving packing details for an output tile tensor including information indicative of: (i) a first set of k packing values, $t_1$, $t_2$ . . . $t_k$, that represent tile dimension sizes for the output tile tensor data structure, and (ii) a second set of k packing values, $r_1$, $r_2$ . . . $r_k$, that respectively represent replication counts for each dimension of the input tensor,
replicating the input tensor in a computer memory device to obtain an intermediate tensor, with each given dimension of the k dimensions of the input tensor being replicated a number of times equal to the replication count value respectively corresponding to the given dimension, so that the intermediate tensor has a shape characterized by $n_1*r_1$, $n_2*r_2$ . . . $n_k*r_k$ such that an element at zero-based indices ($i_1$, $i_2$, . . . , $i_k$) of the intermediate tensor is equal to the element of the input tensor with indices as given by the following mathematical expressions: $i_1$ modulo ni, $i_2$ modulo $n_2$ . . . $i_k$ modulo $n_k$,
allocating a plurality of tiles in the computer memory device, with tile each tile including a sufficient number of memory cells to be capable of storing s numbers,
for each given tile T of a plurality of tiles, mapping each location of a plurality of locations of the given tile T in the computer memory device T[0], T[1], . . . T[s−1], to indices of a tensor that is characterized by dimension sizes equal to the first set of k packing values, $t_1$, $t_2$ . . . $t_k$,
constructing the output tensor of tiles as a data structure in the computer memory device,
computing a mapping between elements of the intermediate tensor and elements of the output tensor of tiles, and
copying the data making up the intermediate tensor to the output tensor of tiles data structure in the computer memory device.

20. The CS of claim 19 wherein the computer code further includes data and/or instructions for causing the processor(s) set to perform the following operations:
storing the packing details as output tile tensor metadata alongside the output tensor of tiles to form a full tile tensor output in the computer memory device.

21. The CS of claim 20 further comprising:
unpacking the input tensor from the output tile tensor stored in the computer memory device based on the output tensor of tiles and the metadata; and
restoring the input tensor based on the output tensor of tiles and the metadata.

22. A computer implemented (CIM) method:
receiving input tensor metadata including: (i) an integer value k which is equal to a number of dimensions that characterize an input tensor, (ii) a set of length values, $n_1, n_2, n_k$ that respectively characterize each of the k dimensions of the input tensor;
receiving the input tensor;
receiving packing details for an output tile tensor including information indicative of: (i) a first set of k packing values, $t_1, t_2 \ldots t_k$, that represent tile dimension sizes for the output tile tensor data structure, and (ii) a second set of k packing values, $r_1, r_2 \ldots r_k$, that respectively represent replication counts for each dimension of the input tensor;
replicating the input tensor in a computer memory device to obtain an intermediate tensor, with each given dimension of the k dimensions of the input tensor being replicated a number of times equal to the replication count value respectively corresponding to the given dimension, so that the intermediate tensor has a shape characterized by $n_1*r_1, n_2*r_2 \ldots n_k*r_k$ such that an element at zero-based indices (i1,i2, . . . , ik) of the intermediate tensor is equal to that element as given by the following mathematical expressions: $i_1$ modulo operator $n_1$, $i_2$ modulo operator $n_2$ . . . $i_k$ modulo operator $n_k$;
allocating a plurality of tiles in the computer memory device, with tile each tile including a sufficient number of memory cells to be capable of storing s numbers;
mapping the plurality of tiles to an output tile tensor that is characterized by dimension sizes equal to the first set of k packing values, $t_1, t_2 \ldots t_k$, with the mapping of the plurality of tiles including mapping each element of the tensor respectively mapped to a physical location from a plurality of locations in the computer memory device T[0], T[1], . . . T[s−1];
constructing the output tile tensor as a data structure in the computer memory device;
computing a mapping between elements of the intermediate tensor and elements of the output tile tensor; and
copying the data making up the intermediate tensor to the output tile tensor data structure in the computer memory device.

23. The CIM of claim 22 further comprising storing the packing details as output tile tensor metadata alongside the output tile tensor in the computer memory device.

24. A computer program product (CPP) comprising:
a set of storage device(s); and
computer code stored collectively in the set of storage device(s), with the computer code including data and instructions to cause a processor(s) set to perform at least the following operations:
receiving input tensor metadata including: (i) an integer value k which is equal to a number of dimensions that characterize an input tensor, (ii) a set of length values, $n_1, n_2, n_k$ that respectively characterize each of the k dimensions of the input tensor,
receiving the input tensor,
receiving packing details for an output tile tensor including information indicative of: (i) a first set of k packing values, $t_1, t_2 \ldots t_k$, that represent tile dimension sizes for the output tile tensor data structure, and (ii) a second set of k packing values, $r_1, r_2 \ldots r_k$, that respectively represent replication counts for each dimension of the input tensor,
replicating the input tensor in a computer memory device to obtain an intermediate tensor, with each given dimension of the k dimensions of the input tensor being replicated a number of times equal to the replication count value respectively corresponding to the given dimension, so that the intermediate tensor has a shape characterized by $n_1*r_1, n_2*r_2 \ldots n_k*r_k$ such that an element at zero-based indices (i1,i2, . . . , ik) of the intermediate tensor is equal to that element as given by the following mathematical expressions: $i_1$ modulo operator $n_1$, $i_2$ modulo operator $n_2$ . . . $i_k$ modulo operator $n_k$,
allocating a plurality of tiles in the computer memory device, with tile each tile including a sufficient number of memory cells to be capable of storing s numbers,
mapping the plurality of tiles to an output tile tensor that is characterized by dimension sizes equal to the first set of k packing values, $t_1, t_2 \ldots t_k$, with the mapping of the plurality of tiles including mapping each element of the tensor respectively mapped to a physical location from a plurality of locations in the computer memory device T[0], T[1], . . . T[s−1],
constructing the output tile tensor as a data structure in the computer memory device,
computing a mapping between elements of the intermediate tensor and elements of the output tile tensor, and
copying the data making up the intermediate tensor to the output tile tensor data structure in the computer memory device.

25. The CPP of claim 24 wherein the CPP is in the form of a computer system (CS), with the CPP further comprising the processor(s) set.

\* \* \* \* \*